United States Patent
Gelin et al.

[11] 3,788,285
[45] Jan. 29, 1974

[54] ELECTRONIC FUEL INJECTION CONTROL DEVICE

[75] Inventors: Jacques Andre Gelin; Alain Joseph Dera, both of Billancourt, France

[73] Assignee: Regie Nationale Des Usines Renault Billoncourt, Hauts-de-Seine, France

[22] Filed: Dec. 6, 1971

[21] Appl. No.: 204,970

[30] Foreign Application Priority Data
Dec. 11, 1970 France .............................. 70.44781

[52] U.S. Cl. ..... 123/32 EA, 123/139 E, 123/32 AE, 73/194
[51] Int. Cl. ... F02b 3/00, F02m 39/00, B21d 13/04
[58] Field of Search ........ 123/32 EA, 32 AE, 139 E

[56] References Cited
UNITED STATES PATENTS
3,470,858  10/1969  Mycroft ............................. 123/32
3,203,410  8/1965  Scholl ................................. 123/32
3,240,191  3/1966  Wallis ................................. 123/32

Primary Examiner—Laurence M. Goodridge
Assistant Examiner—Ronald B. Cox
Attorney, Agent, or Firm—Stevens, Davis, Miller & Mosher

[57] ABSTRACT

An electronic injection control device for an internal combustion engine comprising an air input pick-up consisting of a helix disposed within the air induction manifold, a photo-diode cell and a light source, the pick-up delivering through the medium of an electronic generator signals in the form of gating pulses having a duration equal to a frequency proportional to the measured air input, an electronic power assembly responsive to the generator and an electronic corrective assembly for modifying the duration of the gates as a function of various parameters, the signals controlling the injection action of the fuel injector.

5 Claims, 5 Drawing Figures

PATENTED JAN 29 1974

ELECTRONIC FUEL INJECTION CONTROL DEVICE

This invention relates to fuel injection systems and has specific reference to an electronic fuel injection device applicable to internal combustion engines and notably to those of the controlled-ignition type.

Various electronic fuel injection systems have already been proposed. The majority of these systems have the twofold feature consisting of on the one hand subordinating the time in which the fuel is injected into a gas induction pipe to the operation of a trigger system operatively connected to the engine in such a way that there is one fuel injection per cycle for a given cylinder, and on the other hand calculating the amount of fuel required for this cycle by detecting the value of the pressure between the manifold shutter or butterfly valve and the inlet valve of the cylinder.

These systems require particularly elaborate calculations and corrections which are accomplished in an electronic computer.

It is the essential object of the present invention to provide an electronic injection device capable of producing a satisfactory fuel combustion or carburetion by using more economical means, the fuel being injected only by equal amounts when required by the engine.

According to this invention, the amount of fuel necessary for a proper combustion is measured by detecting the volume or, more advantageously, the weight of the air sucked in by the engine, upstream of the butterfly value, that is, by detecting the atmospheric pressure, the injection frequency being constantly proportional to the amount of air thus measured.

On the other hand, the necessary corrections when starting a cold engine, operating at high engine speeds, during accelerations (pick-ups), decelerations or under other particular conditions, consist of modifying the unitary amount of fuel introduced at each injection pulse, without modifying the injection frequency which remains proportional to the measured weight and volume of incoming air.

This electronic fuel injection device for an internal combustion engine comprising a butterfly valve in its induction pipe for throttling more or less the incoming combustion air, and injectors consisting advantageously of solenoid-operated valves of the type adapted to be opened when energized for injecting fuel into the engine cylinders, is characterized essentially in that it comprises an air input pick-up mounted in said induction pipe upstream or downstream of said butterfly valve and delivering to said fuel injectors, with the assistance of an electronic generator, control signals in the form of gating pulses of equal duration and at a frequency proportional to the measured air input, and an electronic corrective unit for modifying the duration or time of the emitted gating pulses as a function of a number of parameters.

The injection frequency is thus directly proportional to the volume of air introduced into the engine, and the corrections brought by said electronic corrective unit with a view to modifying the proportions of the gaseous mixture take due consideration on the one hand of the external temperature and atmospheric pressure, and on the other hand of the excessive time constant of the pick-up transient states.

Other features will appear as the following description proceeds with reference to the accompanying drawings illustrating diagrammatically by way of example a preferred form of embodiment of the invention. In the drawings.

Figure 1:
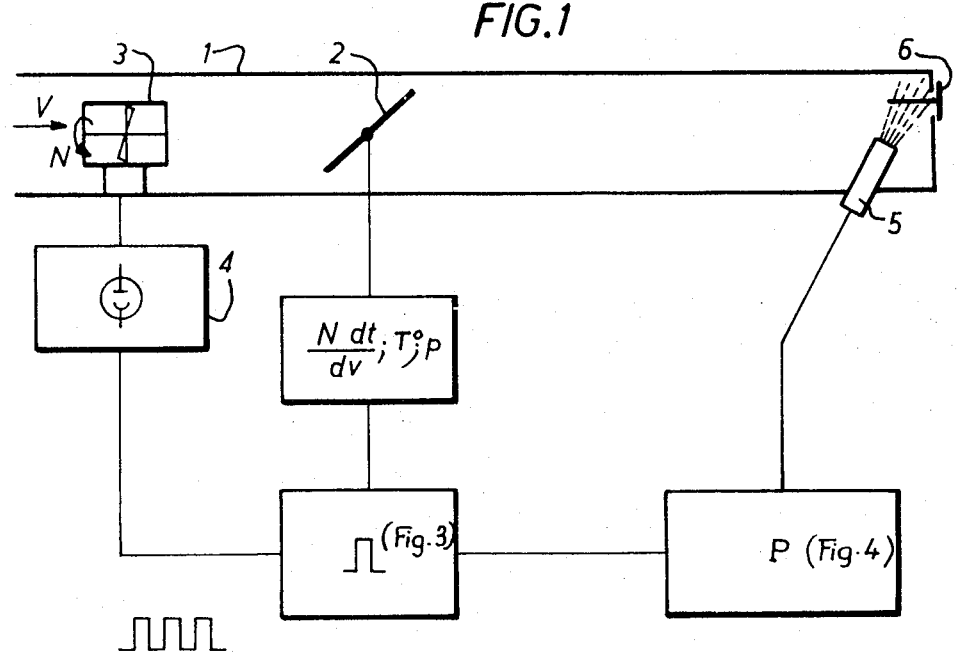
FIG. 1 is a diagram illustrating the basic principle of operation of the fuel injection device of this invention.

Referring first to the diagram of FIG. 1, it will be seen that the device according to this invention comprises in the induction pipe 1 of the engine, upstream of the butterfly valve 2, a flow-meter in the form of a helix or like pallet 3 incorporated in a pick-up or sensor measuring the volume of air penetrating into said pipe, and a photo-diode cell 4 associated with the flow-meter 3. This cell 4 permitting the measurement of the rotational speed N of flow meter 3 (which is proportional to the velocity of flow V of the air stream in pipe 1) is associated in turn with means controlling the frequency of the gating signals emitted by a power generator controlling as a function of this frequency the action of injectors 5 injecting the fuel delivered by a pump (not shown) towards the inlet valves 6 of the engine.

On the other hand, the angular position of the air shutter or butterfly valve 2 provides a characteristic datum as to the transient speed of the engine and permits the measurement of the variation in the speed of the helix or pallet 3 in relation to the air flow rate; dN / dv. This last value is added to the measurements of the variations in the temperature and pressure of the external atmosphere, and the sum is transmitted to an electronic control unit for correcting the width of the gating signal emitted by the generator which determines the operative time of the power circuit controlling the fuel injectors.

These injectors consist advantageously of solenoid-operated ball valves. They are of the type opening when energized and responsive to voltage gating pulses of variable width and frequency.

Figure 2:
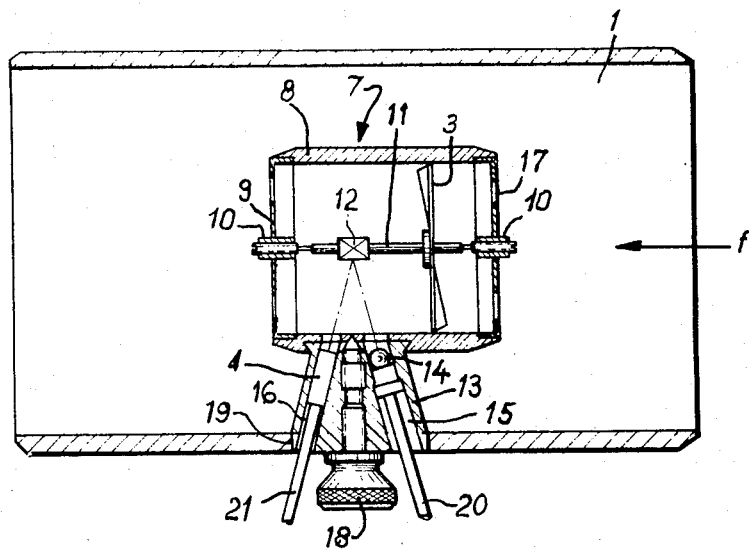
FIG. 2 is a diagrammatic sectional view showing on a larger scale details of a pick-up or sensor mounted in the engine induction pipe or manifold.

Referring to FIG. 2, it will be seen that the pick-up 7 constituting an integral unit comprises a cylindrical case 8 closed by a pair of end plates 9 carrying central bearings 10 consisting of jewels. Journalled in said bearings 10 are the end trunnions of a shaft 11 supporting on one side a helix or pallet 3 constituting the flow-meter proper and on the other side a mirror 12. The shaft trunnions pivot freely in said bearings 10. Registering with the mirror 12 is a plug 13 fitted in the wall of case 8 and enclosing on one side a light source 14 and on the other side a photo-diode cell 4. The light source and diode cell are disposed in separate channels 15 and 16 extending symmetrically in relation to the mirror 12 so that the light beam from said source 14 impinges on the mirror 12 and is reflected thereby towards the diode cell 4.

The helix 3 comprises for instance four blades cut and shaped to a pitch angle of 60°, the outer diameter of the helix being 16 mm and its thickness 2 mm.

The case 8 is fitted within the air induction pipe 1 and the air issuing from a filter (not shown) towards the engine in the direction of the arrow $f$ flows through apparatus 17 formed in the end plates 9 of case 8. A needle valve comprising a screw-threaded shank and a knurled head 18 is provided for centering the plug 13 having its outer end fitted in an aperture 19 formed in the wall of pipe 1.

An electric cable 20 connects the light source 14 to the ignition circuit of the engine, and another cable 21 connects the photo-diode cell 15 reading the rotational speed of screw 3 to a gating generator to be described presently.

When the rated engine speed is attained the incidence of the air flow becomes zero and the relationship of the speed triangle of the helix gives a satisfactory approximation of the rotational speed of the helix.

Under transient speed conditions and according to a rough estimation, the time necessary for the helix 3 to come to a standstill is about twenty times that necessary for rotating according to the axial flow of the air stream in duct 1.

Now the direct measurement of the air throughput by means of this helix constitutes an efficient means for simplifying greatly the electronic control system.

In fact, the counting of the rotational frequency of said helix 3 by means of a photo-diode cell 4 illuminated by the light source 14 utilized for controlling directly the opening frequency of the solenoid-operated injection valve 5.

Figure 3:
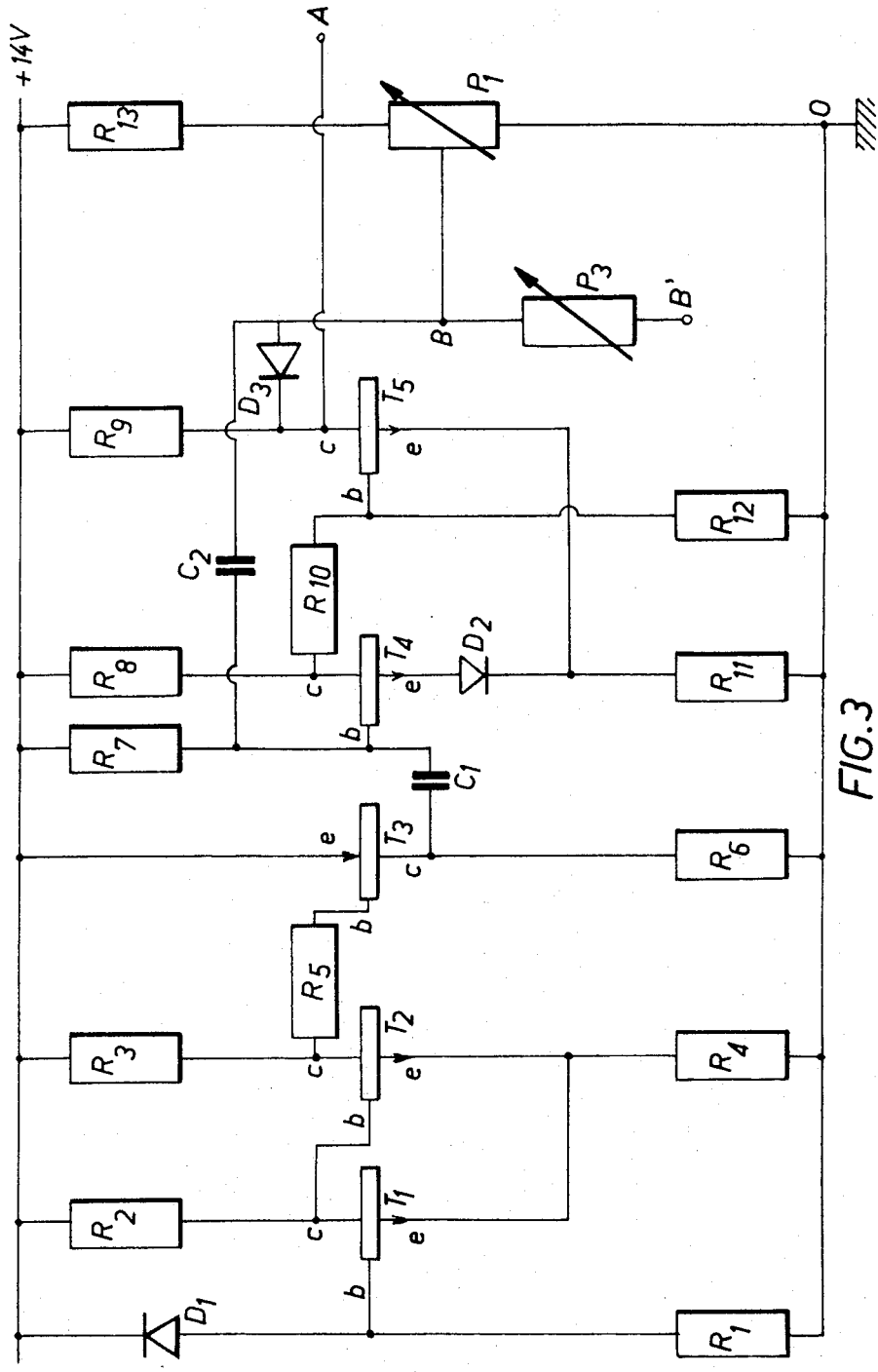
FIG. 3 is a block diagram illustrating the electric connections of the gating pulse generator.

The electronic control unit comprises firstly a gating pulse generator of which the block diagram is illustrated in FIG. 3.

This generator connected to the photo-diode cell 4 designated by the reference symbol $D_1$ in the diagram comprises a pair of n-p-n transistors $T_1$ and $T_2$ operating as a flip-flop or univibrator. Diode $D_1$ is inserted in the normally non-conductive direction between the +14-Volt supply voltage (having its negative terminal grounded to constitute the "0-Volt" terminal) and the base $b$ of transistor $T_1$ connected through a biasing resistor $R_1$ to said zero terminal. The collector $c$ of transistor $T_1$ is connected on the other hand through a ballast resistor $R_2$ to the +14-Volt terminal and on the other hand to the base $b$ of transistor $T_2$. The emitters e of both transistors $T_1$ and $T_2$ are connected to each other and through a resistor $R_4$ to the zero terminal, and collector $c$ of transistor $T_2$ is connected via a ballast resistor $R_3$ to the +14-Volt terminal and via another biasing resistor $R_5$ to the base $b$ of a p-n-p amplifying transistor $T_3$ having its emitter $e$ connected to the +14-Volt terminal and its collector $c$ connected via a ballast resistor $R_6$ to said zero terminal.

The generator further comprises a monostable multivibrator consisting of transistors $T_4$ and $T_5$ of the n-p-n type. The base of transistor $T_4$ is connected via a biasing resistor $R_7$ to the +14-Volt terminal and through a capacitor $C_1$ to the collector of transistor $T_3$. The collector of transistor $T_4$ is connected via a ballast resistor $R_8$ to said 14-V terminal and via another resistor $R_{10}$ to the base of transistor $T_5$. The emitter of transistor $T_4$ is connected through a diode $D_2$ in series with a resistor $R_{11}$ to said zero terminal, the d.c. in this diode being allowed to flow from the emitter. The junction point of diode $D_2$ with its resistor $R_{11}$ is connected to the emitter of transistor $T_5$ and the latter has its base connected to the junction point of the pair of series-connected resistors $R_{10}$ and $R_{12}$ constituting a voltage divider connecting the collector of transistor $T_4$ to the zero terminal.

A ballast resistor $R_9$ connects the collector of transistor $T_5$ to the +14-V terminal, the same collector being connected via a bonding capacitor $C_2$ to the base of transistor $T_4$, the d.c. being allowed to flow through the diode towards the collector of transistor $T_5$. The charging voltage of this last-named capacitor $C_2$ is determined by a junction point B connected on the one hand to the junction point of capacitor $C_2$ and diode $D_3$, and on the other hand to a potentiometer $P_1$ determining the time constant of capacitor $C_2$, said potentiometer being inserted between the zero terminal and another resistor $R_{13}$ connected to the 14-V terminal. Under these conditions, the voltage obtained at said point B may be modified either by means of potentiometer $P_1$ or through a corrective d.c. voltage fed to B' and transmitted through a potentiometer $P_3$, as will be explained presently. The generator output taken at the collector $c$ of transistor $T_5$ is connected to a point A.

The gating pulse generator operates as follows:

The light source 14 of FIG. 2 is supplied with current through the ignition switch of the thermal engine. When this switch is in its OFF position, no light is emitted by the source 14 towards the photo-diode $D_1$. Since the inverse resistance of diode $D_1$ is high in comparison with that of resistor $R_1$, no biasing voltage is fed to the base of transistor $T_1$ and therefore the latter is blocked or remains non-conductive. Thus, the base of transistor $T_2$ having a positive bias due to the resistor $R_2$ is thus saturated and therefore becomes conductive. The collector voltage of transistor $T_2$ is then very close to zero (except for the saturation voltage $V_{ce}$ between this collector and the emitter, and the voltage drop in resistor $R_4$). The base $b$ of transistor $T_3$ is thus biased negatively through resistor $R_5$ with respect to its emitter $e$, so that this transistor becomes conductive; consequently a positive voltage is available at its collector $c$ (with an approximation corresponding to the saturation voltage $V_{ce}$).

The multivibrator $T_4 - T_5$ is thus in its stable condition. The base of transistor $T_4$ is biased positively in relation to its emitter by resistor $R_7$, and transistor $T_4$ is conductive and keeps transistor $T_5$ in its blocked or non-conductive condition, the base of this transistor $T_5$ being biased negatively in relation to its emitter through the voltage divider $R_{10}$, $R_{12}$. During this period the diode $D_3$ isolates from capacitor $C_2$ the now positive collector of transistor $T_5$.

When, as a consequence of the switching on of the engine ignition switch, the light source 14 is energized, the light pulses are directed towards the photo-diode cell $D_1$ at a frequency proportional to the rotation of helix 3, thus reducing to a low value the inverse resistance of this photo-diode $D_1$. Consequently, a positive pulse is fed to the base of transistor $T_1$ which becomes conductive and blocks the other transistor $T_2$ of which the base becomes negative in relation to its emitter. Transistor $T_3$ is also blocked and its collector transmits via capacitor $C_1$ a negative pulse to the corresponding control electrode of the monostable multivibrator $T_4 - T_5$. This pulse blocks transistor $T_4$, thus saturating through resistors $R_8$ and $R_{10}$ transistor $T_5$. This condition (i.e., $T_4$ blocked and $T_5$ saturated) constitutes the unstable condition of the monostable multivibrator.

Capacitor $C_2$ is discharged through the circuit comprising resistor $R_7$, diode $D_3$ (now conducting due to the voltage drop in the collector of transistor $T_5$), transistor $T_5$ and resistor $R_{11}$. This unstable condition prevails until capacitor $C_2$ is discharged, i.e., at the end of a time period determined by the potential at point B. Then the multivibrator resumes its stable condition, resistor $R_7$ supplying again current to transistor $T_4$ of which the collector then assumes a negative output.

Figure 4:
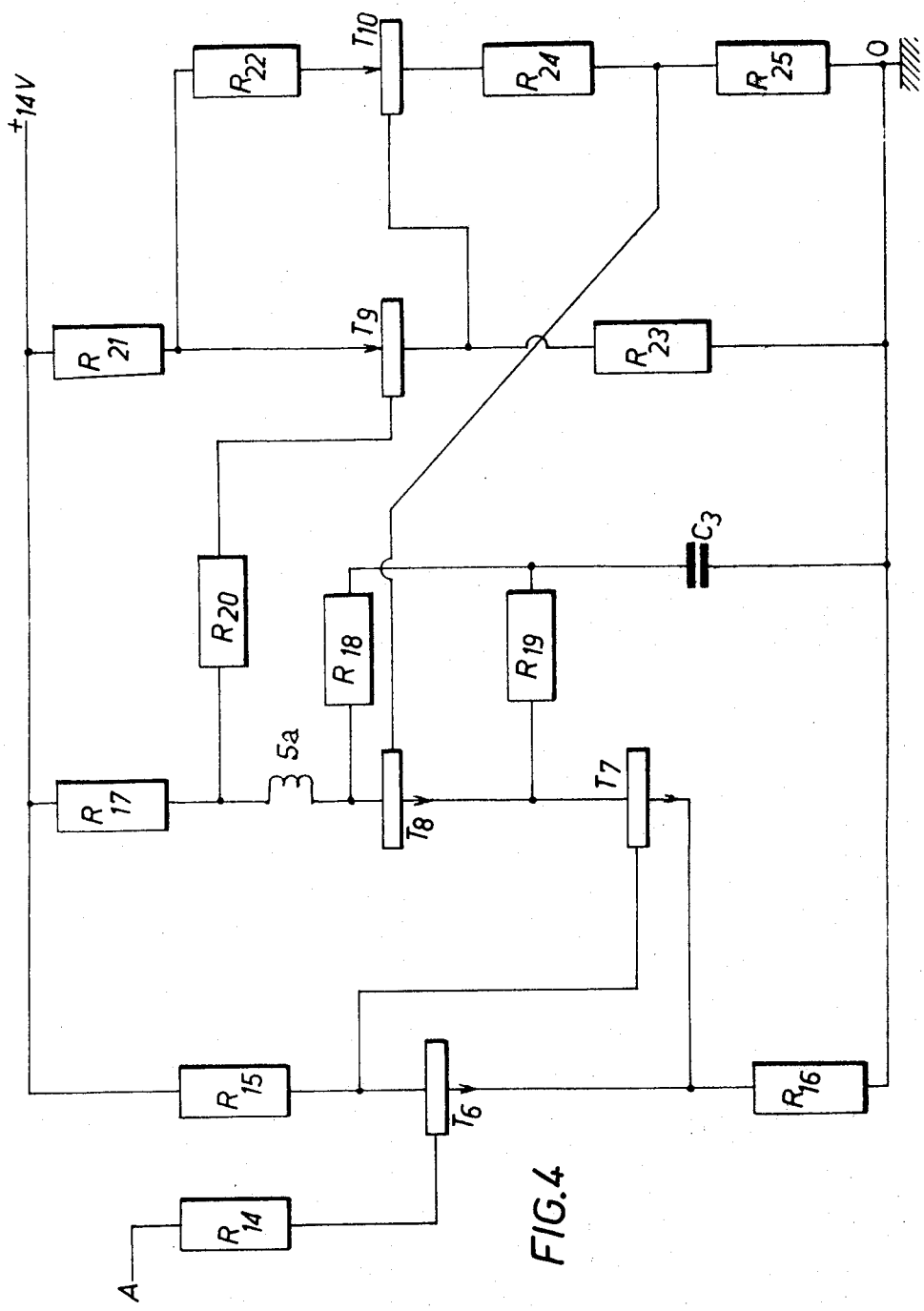
FIG. 4 is a block diagram illustrating the electronic power unit controlling the injectors.

The gate signals emitted by the generator are fed to an output point A connected to the collector of transistor $T_5$ and linked to the electronic unit controlling the fuel injectors, the block diagram of this unit being illustrated in FIG. 4. The function of this unit is to limit the current in the coils of the solenoid-operated injectors valves for the dual purpose of improving the actuation time and reducing consumption. With the present circuit means these two amplifying and limiting functions are separated.

The control assembly comprises a flip-flop or univibrator consisting of a pair of transistors $T_6$ and $T_7$ of the n-p-n type, identical with the univibrator $T_1 - T_2$ illustrated in FIG. 3 and described hereinabove. The base of transistor $T_6$ receives the signals from the generator through its resistor $R_{14}$ connected to the abovementioned point A. The collector of transistor $T_6$ is connected via a resistor $R_{15}$ to the +14-Volt source and directly to the base of transistor $T_7$. The emitters of both transistors $T_6$ and $T_7$ are connected through a common resistor $R_{16}$ to the zero-voltage terminal. The collector of $T_7$ is connected to the emitter of another transistor $T_8$ of the n-p-n type having its collector connected on the one hand to the +14-Volt terminal via the coil $5a$ of a solenoid-operated valve 5 in series with a control resistor $R_{17}$ and on the other hand to the zero terminal through a resistor $R_{18}$ in series with a capacitor $C_3$. Another resistor $R_{19}$ connects the collector of $T_7$ to the junction point of resistor $R_{18}$ and capacitor $C_3$. The junction point between coil $5a$ and resistor $R_{17}$ is connected via a resistor $R_{20}$ to the base of a n-p-n transistor $T_9$ constituting with a transistor $T_{10}$ of same type a flip-flop or univibrator. The emitter of $T_9$ is connected through a resistor $R_{21}$ to the +14-Volt terminal, and its collector is connected on the one hand through a ballast resistor $R_{23}$ to the zero terminal and on the other hand to the base of transistor $T_{10}$ having its emitter connected via a resistor $R_{22}$ to the emitter of $T_9$ and its collector connected to the zero terminal through a voltage divider consisting of a pair of series-connected resistors $R_{24}$ and $R_{25}$. The junction point of these last-named resistors is connected to the base of transistor $T_8$, as shown.

The injector control assembly operates as follow :

In the inoperative condition, i.e., when no gating pulses are fed to A, transistor $T_6$ is saturated since its base has a positive voltage in relation to the emitter. Transistor $T_7$ having its base substantially at the same potential as its emitter is thus blocked. No current flows through resistor $R_{17}$, and transistor $T_9$ is blocked, as its base is biased positively so as to saturate transistor $T_{10}$ of which the base is rendered negative by the presence of resistor $R_{23}$. The voltage divider $R_{24}$–$R_{25}$ keeps the base of transistor $T_8$ at a positive voltage sufficient for saturating $T_8$.

When a gating pulse from the generator (which is negative in relation to the +14-Volt source) triggers the flip-flop or univibrator $T_6 - T_7$ by making $T_7$ conductive, the coil $5a$ is energized through the circuit elements $R_{16}$, $T_7$, $T_8$ and $R_{17}$. Current is thus caused to flow through $R_{17}$ and, through the medium of resistor $R_{20}$, releases transistor $T_9$ when a certain current value or threshold is overstepped. Transistor $T_{10}$ is then blocked and causes $T_8$ to be blocked in turn. Coil $5a$ is then fed through $R_{17}$ on one side and through $R_{18}$, $R_{19}$, $T_7$ and $T_6$ on the other side. Current is thus reduced until the voltage drop across the terminals of $R_{17}$ is low enough to block again transistor $T_9$ and therefore to saturate $T_{10}$ and $T_8$. Consequently, the current oscillates between two values depending on the hysteresis of flip-flop $T_9$ and $T_{10}$. Capacitor $C_3$ recovers energy during the current reduction and delivers it back when the current rises again.

Figure 5:
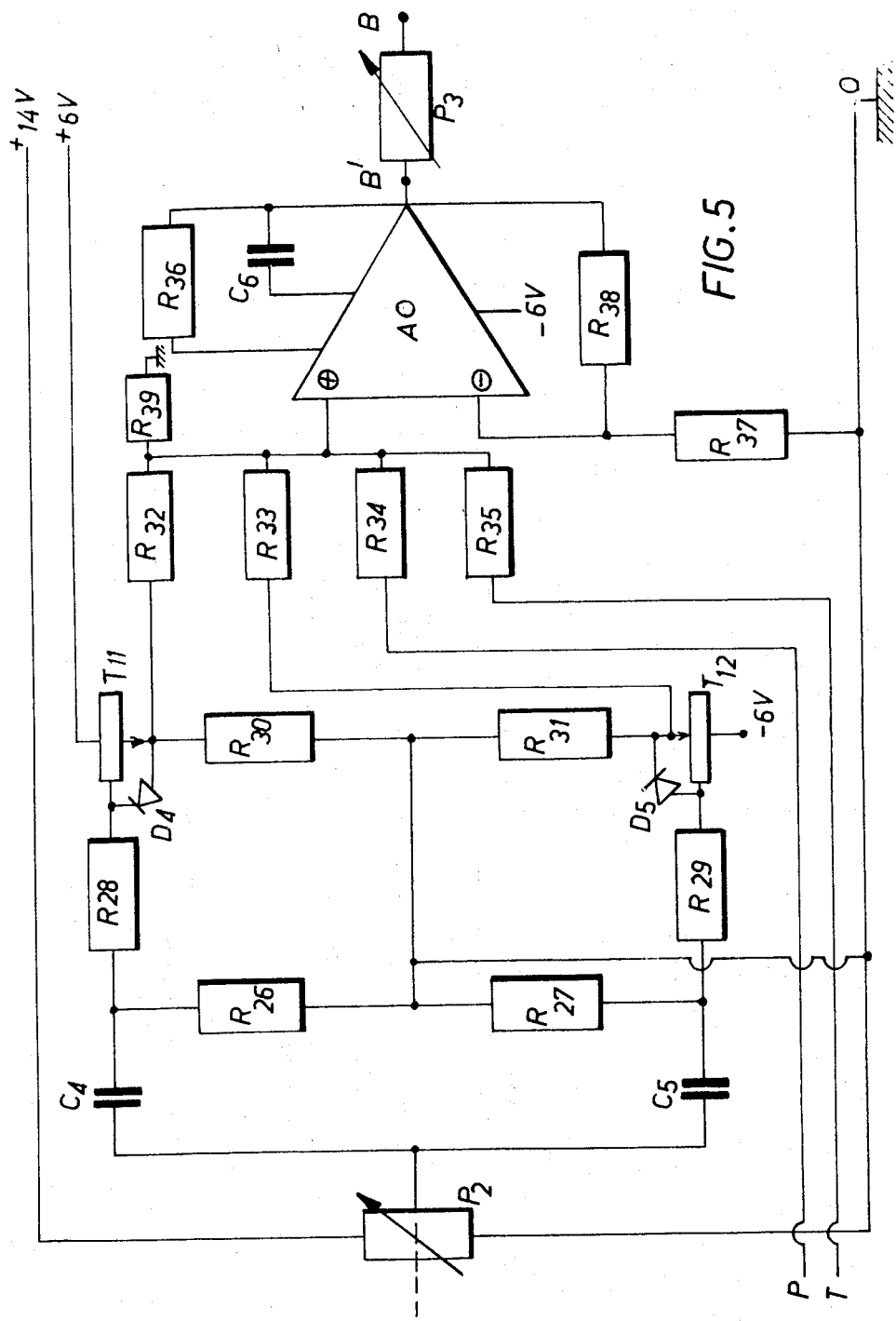
FIG. 5 is another block diagram illustrating the electronic corrective unit.

An electronic corrective unit or assembly of which the block diagram is illustrated in FIG. 5 permits correction of the duration of the rectangular width of the pulse emitted by the generator in order to modify the porportions of the air-fuel mixture for taking due account on the one hand of an excessive time constant of the pick-up helix or screw 3 during transient engine speed periods (0.1 second upwards, 2 seconds downwards), amd on the other hand of the external conditions concerning the atmospheric temperature and pressure.

By delivering a suitable voltage to point B of the generator of FIG. 3, the gate time is modified, the increment in this time corresponding to a richer gaseous mixture.

The corrective unit comprises a potentiometer $P_2$ connected either to the butterfly valve 2 controlling the ingress of air into the engine induction pipe or manifold or to the accelerator pedal (not shown). This potentiometer $P_2$ connected on one side to the +14-Volt terminal and on the other side to the zero terminal has its sliding contact connected to one of the electrodes of both capacitors $C_4$ and $C_5$, the other electrode of each capacitor $C_4$ and $C_5$ being connected to one end of a bridge consisting of a pair of serise-connected resistors $R_{26}$ and $R_{27}$. These capacitors derivate the voltage variations of potentiometer $P_2$ corresponding to the variation in the position of said butterfly valve with time constants $C_4 - R_{26}$ and $C_5$-$R_{27}$, respectively. Capacitors $C_4$ and $C_5$ transmit the incoming pulses via resistors $R_{28}$, $R_{29}$, respectively, to the base of transistors $T_{11}$ and $T_{12}$, respectively, the first transistor $T_{11}$ of the n-p-n type being rendered conductive by a positive pulse and the other, of the p-n-p type, by a negative pulse. The amplitude of these pulses depends on the variations of potentiometer $P_2$.

The collectors of transistors $T_{11}$ and $T_{12}$ are connected to +6-Volt and −6-Volt terminals, respectively, and their emitters are interconnected through a pair of series-connected resistors $R_{30}$ and $R_{31}$ and having their common junction point connected to the junction point of resistors $R_{26}$ and $R_{27}$. Relevant diodes $D_4$ and $D_5$ are provided for preventing the emitter-to-base passage of pulses, these being negative in the case of transistor $T_{11}$ and positive in the case of transistor $T_{12}$.

The output pulses directed to the emitter of $T_{11}$ correspond to accelerations, and those directed to the emitter of $T_{12}$ correspond to decelerations. Their time constants are rendered indepedent of each other.

The emitters of transistors $T_{11}$ and $T_{12}$ are connected through resistors $R_{32}$ and $R_{33}$ respectively, forming a voltage divider with another resistor $R_{39}$ to a first input + of an operative amplifier AO coupled as an adder. The other input − of the amplifier is connected via a resistor $R_{37}$ to the zero terminal. Its output B' is connected on the one hand through a resistor $R_{38}$ to the other input and through another resistor $R_{36}$ and a feedback capacitor $C_6$ to the equalizing outputs.

On the other hand, suitable pick-ups, not shown, convert the variations in atmospheric temperature and pressure into corresponding voltage variations T and P, respectively, these last-named variations being fed via resistors $R_{34}$ and $R_{35}$ to the input of operative amplifier AO.

The amplifier AO delivers a continuous voltage depending on the pressure and temperature conditions, this voltage being modulated by the transient corrections entailed by the pick-up defects. The incidence of this correction on the gate time is adjusted by means of the linking potentiometer $P_3$ connecting the output B' to the gate generator output terminal B of FIG. 3.

What is claimed is :

1. An electronic injection control device for an internal combustion engine having an air-throttling butterfly valve mounted in an induction pipe, injectors comprising solenoid-operated valves which open when energized for injecting fuel into the engine cylinders, and an air-input pick-up inserted in said induction pipe on one side of said butterfly valve for measuring by its rotational speed the volume of incoming air, and an electronic generator for delivering to said injectors rectangular control signal gating pulses of equal time duration and having a frequency proportional to the measured air throughput and to the quantity of fuel to be injected, said pick-up comprising a helix associated with a mirror, both rotating freely within the induction pipe and being spaced apart from said air-throttling butterfly valve, a photo-diode cell associated with said mirror, for determining the rotational speed of said helix, and a light source for illuminating said mirror, said photo-diode cell being associated with said control signal generator for emitting injection control gating pulse signals at a frequency proportional to the velocity of rotation of said helix, and an electronic assembly, responsive to the signals emitted by said generator, controlling all said injectors for releasing the injection action of each injector.

2. An electronic injection control device according to claim 1 wherein said helix includes a plurality of blades and said pick-up further comprises a casing, a shaft connected to said casing and carrying said helix and said mirror, an inlet plug connected to said casing containing in channels registering with said mirror said light source, illuminating said mirror and said photo-diode cell receiving the light beam from said mirror.

3. An electronic injection control device according to claim 1 wherein said generator delivering control signal gating pulses comprises a transistorized flip-flop associated with said photo-diode cell, an amplifying transistor, and a monostable multivibrator receiving through a capacitor the signal transmitted by said amplifying transistor and emitting gated rectangular pulses of adjustable width.

4. An electronic injection control device according to claim 1 wherein said electronic assembly comprises a first transistorized flip-flop receiving the signals from said electronic generator, a power transistor inserted in the circuit of a coil of said solenoid operated valves and of a transistor of said first flip-flop, and a second flip-flop controlling said power transistor.

5. An electronic injection control device according to claim 1 wherein said electronic assembly comprises a potentiometer connected to a member controlling engine acceleration, a pair of transistors, one of the n-p-n type and the other of the p-n-p type, each connected to said potentiometer through a capacitor, the output pulses of one transistor corresponding to acceleration and the output pulses of the other transistor corresponding to deceleration, said output pulses having independent time constants, an adder comprising an operational amplifier receiving said output pulses and pulses corresponding to parameters of atmospheric pressure and temperature, so as to emit adjustable voltages transmitted to said electronic generator for correcting the duration of said control signal gating pulses.

* * * * *